Dec. 23, 1958     F. J. MORLEY, JR., ET AL     2,866,079
ARC WELDING APPARATUS
Filed Feb. 18, 1957     2 Sheets-Sheet 2

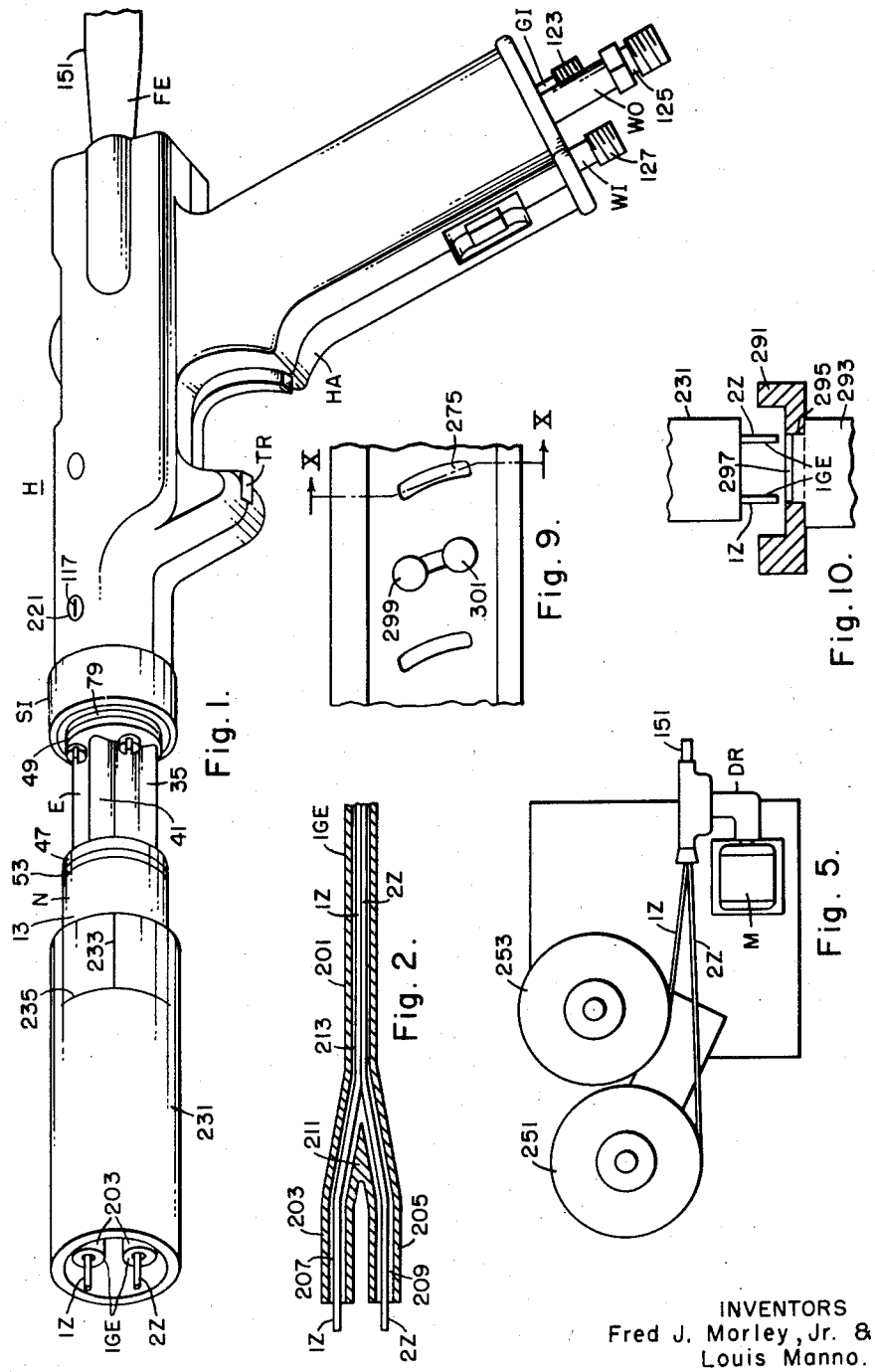

United States Patent Office 2,866,079
Patented Dec. 23, 1958

2,866,079
ARC WELDING APPARATUS

Fred J. Morley, Jr., Hempfield Township, Westmoreland County, and Louis Manno, Wilkinsburg, Pa., assignors to Westinghouse Electric Corporation, East Pittsburgh, Pa., a corporation of Pennsylvania Application February 18, 1957, Serial No. 640,864

2 Claims. (Cl. 219—130)

This application relates to arc welding and has particular relation to guns for arc welding with consumable electrodes.

Apparatus constructed in accordance with the teachings of the prior art is typified by the welding gun disclosed in application Serial No. 465,508, filed October 29, 1954, to Joseph F. Miller (which will be called herein the Miller gun) and the torch disclosed in application Serial No. 550,106, filed November 30, 1955, to Harry J. Bichsel (which will be called herein the Bichsel torch). The Miller gun and the Bichsel torch include a barrel in which an arc-welding consumable electrode is received and a channel through which it is transmitted. At the end of the channel there is a nozzle with an opening through which the tip of the electrode which constitutes the terminus of the arc passes. The Miller gun and the Bichsel torch have proved highly useful, but their use has been limited because they permit the deposit only of a single bead or a single spot. There are situations in which it is desirable that a plurality of parallel beads or spots be produced and in such situations it is desirable that the beads or spots be deposited simultaneously. One such situation is in the welding of a footbracket to the stator frame of a motor; another such situation is in the welding of the vane blades into a turbine generator stator blade ring.

It is, accordingly, an object of this invention to provide a welding gun with which a plurality of beads or spots can be deposited in a single welding operation.

An incidental object of this invention is to provide a novel electrode guide particularly suitable for a gun with which a plurality of beads or spots may be deposited in a single welding operation.

An ancillary object of this invention is to provide a novel method of welding which may be advantageously practiced with a gun of the above-mentioned type.

In accordance with this invention, a gun for consumable electrode welding is provided which has an electrode guide unit consisting of a main tube portion from one end of which a plurality of branch tube portions extend. This unit is so mounted in the gun that electrodes in passing through the electrode channel of the gun first pass into the main tube portion. At the junction of the branch tube portions and the main tube portions the electrodes are separated, each passing through a different branch tube portion. The electrode guide is so disposed that the branch tube portions are adjacent the nozzle end of the gun. In the use of the gun the separate electrodes pass through the branch tube portions and when arcs are struck between these electrodes and the work, separate beads or spots are deposited.

Since the electrodes pass through a common guide and receive their current through the guide, all electrodes may be supplied from a single power supply. The electrode guide unit is provided with facilities for separating electrodes passing through the main portion. But if difficulty is involved in automatically feeding the electrodes so that each passes through a separate branch portion, the electrode guide unit may be threaded by hand. For this purpose the guide tube may be removed through the nozzle, the electrodes passed through the body of the gun and then each threaded through the main tube portion and a separate branch tube portion manually.

The gun described here is particularly suitable for welding in situations where parallel beads or parallel spots are to be produced. It may also be used with advantage for welding in situations in which the deposit is an alloy composed of different materials deposited in a common pool in a predetermined relationship.

The novel features considered characteristic of this invention are disclosed generally above. The invention itself both as to its organization and its method of operation, together with additional objects and advantages thereof will be understood from the following description of a specific embodiment when read in conjunction with the accompanying drawings, in which:

Figure 1 is a view in perspective showing a gun in accordance with this invention;

Fig. 2 is a view in longitudinal section of an electrode guide tube in accordance with this invention;

Fig. 5 is a diagrammatic view showing an electrode drive mechanism used in the practice of this invention;

Fig. 9 is a view in top elevation of a turbine-blade-ring assembly to the welding of which this invention is particularly applicable; and Fig. 10 is a view in section taken along lines X—X of Fig. 9.

Figure 7:
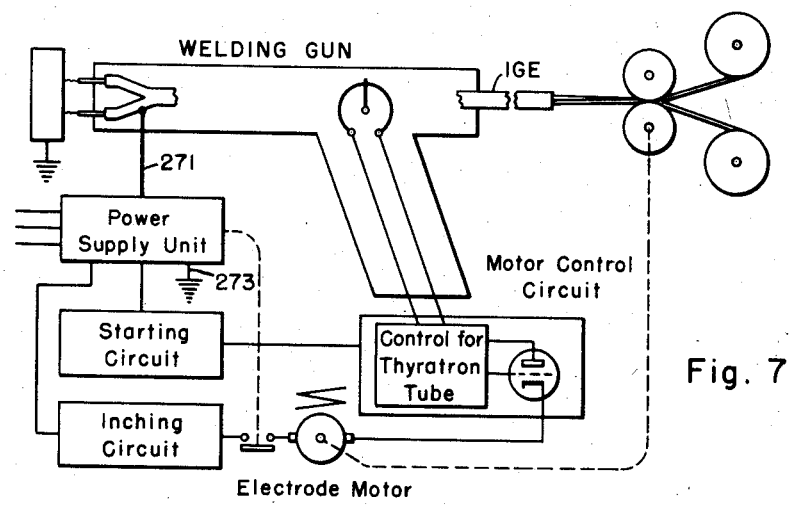
Fig. 7 is a diagrammatic view showing a welding system including a gun in accordance with this invention.
Figure 4:
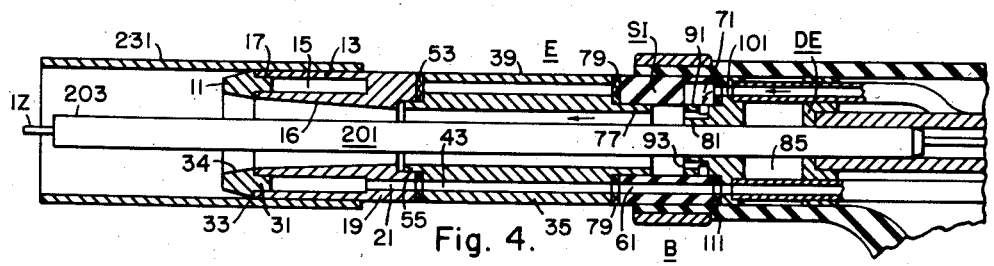
Fig. 4 is a similar view in longitudinal section taken at right angles to the section shown in Fig. 3.
Figure 3:
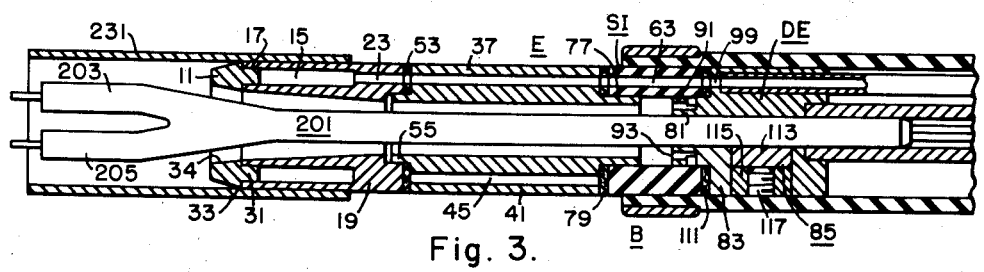
Fig. 3 is a view in longitudinal section of a portion of the gun shown in Fig. 1.

In Figs. 1 through 4, this invention is shown for illustrative purposes only as a gun similar to the Miller gun. The invention is equally well applicable to a torch similar to the Bichsel torch and such a torch is fortunately suitable for automatic welding. To a large extent the gun shown in Figs. 1 through 4 is similar to the Miller gun and for the purpose of aiding in the understanding of the gun disclosed herein the Miller application is incorporated herein by reference.

The apparatus shown in Figs. 1 through 4 includes a gun-barrel and handle assembly including a nozzle assembly N made up of an internally and externally tapered tip 11 which is secured to a nozzle body 13. The internal taper 34 of the tip 11 flares outward. The flare is such that it does not cause turbulence in the gas flowing through the nozzle. The body 13 is in the form of a cylinder having a wall which is hollow at 15 over a substantial portion of the length of the cylinder, and the internal surface 16 of which is tapered. The hollow portion 15 terminates in an annular opening 17 at one end and in a stem 19 at the other end. The stem 19 has a pair of openings 21 and 23 communicating with the hollow portion 15. These openings are preferably displaced by about 90° with reference to the axis of the body 13. The body is internally tapered. The tip 11 includes an attenuated annular portion 31 extending from the tapered portion. This annular portion is dimensioned to be secured in the opening 17 extending from the hollow portion of the body 13 with the edges of the opening engaging shoulder 33 in the tip. The tapered surfaces 16 and 34 of the tip 11 and body 13 are coextensive so that a smooth surface to the flow of gas is presented. The nozzle tip 11 and body 13 are both composed of Cupaloy alloy #7550-6.

The barrel also includes an extension E which is a flanged cylinder, between the external walls of which a plurality of hollow longitudinal tubular projections 35, 37, 39 and 41 extend. For symmetry purposes, four of these projections spaced at 90° with reference to the axis of the extension E may be provided, but only two of these projections 35 and 37 are necessary. These projections 35 and 37 are spaced circumferentially to correspond to the spacing between the openings 21 and 23 in the nozzle body 13 and communicate with corresponding openings 45 in the flanges 47 and 49. In addition, the flanges 47 and 49 are provided with openings 51 which are between these two communicating openings 43 and 45 and through which the extension E is bolted in as a part of the barrel B. The extension E is secured to the nozzle body 13 in such manner that the open tubular projections 35 and 37 communicate with the openings 21 and 23 in the nozzle body. An annular gasket 53 of a material such as asbestos is interposed between the nozzle body 13 and the extension E to prevent leakage of the cooling fluid. To facilitate the securing of the extension E to the nozzle body 13, the body, and the extension, the extension E has a short stem 55 which extends into the body 13.

The barrel further includes an insulating spacer SI preferably composed of nylon. This spacer has a pair of longitudinal openings 61 and 63 circumferentially disposed to correspond to the openings 21 and 23 and 43 and 45 in the nozzle body 13 and in the extension E, and, in addition, a plurality of openings 65 for mounting which are provided with threaded inserts 67. In one of its faces, the spacer SI also has a groove 71 which communicates with the hollow channel 73 through its center. The spacer SI is bolted to the extension E at one of its faces in a position such that the longitudinal openings 61 and 63 therein communicate with the corresponding openings 43 and 45 and 21 and 23 in the extension E and in the nozzle body 13 and the face including the groove 71 is away from the extension E. The insulating spacer SI engages the extension E in a stem 77 and is separated from it by a gasket 79 of asbestos for preventing leakage of the cooling fluid and the gas.

The barrel also includes a header DE (Figs. 3 and 4) which is composed preferably of Cupaloy alloy #7550-6. This header DE is of generally cylindrical form with a flanged stem 81 extending centrally from one of its bases 83. The cylindrical wall has on one side a transverse opening or groove 85 extending circumferentially over an angle of about 180°. This opening communicates with the opening in the central channel 87 of the cylinder which is coextensive with a corresponding opening 89 in the stem. The shoulder 91 of the stem remote from the base 83 of the cylinder has a plurality of longitudinal openings 93. The cylinder has a plurality of openings for securing bolts and, in addition, has three openings 97, 99 and 101, two of which, 97 and 99, correspond to the openings 61 and 63 in the insulating spacer SI and the third 101 to the groove 71 in the insulating spacer SI in circumferential position. The opening 101 corresponding to the groove 71 in the insulating spacer SI is thus displaced by 90° from one of the other openings and by 180° from the other. The header DE is secured to the insulating spacer by bolts extending through the bolt openings in the header and screwed into inserts in the insulating spacer SI. The stem 81 in the header DE engages the opening 75 in the insulating spacer SI firmly and a gasket 111 is interposed between the base 83 of the header DE and the insulating spacer SI. When the header DE is secured to the insulating spacer SI, two of the openings 97 and 99 in the header cylinder communicate with openings 61 and 63 in the insulating spacer and the third 101 communicates with the groove 71 in the insulating spacer.

The gun also includes an electrode guide 1GE which has a main tube portion 201 of generally cylindrical structure from one end of which a plurality of branch tube portions 203 and 205 extend. The branch tube portion openings 207 and 209 are separated by a projection 211 of sharp conical shape which extends towards the opening 213 of the main tube portion 201. The main portion 201 of the electrode guide unit 1GE is capable of passing a plurality of electrodes 1Z and 2Z which are guided into the portions 203 and 205 by the projection 211.

The guide tube 1GE may be secured in the header by a threaded clamp jaw 113 which is held securely between the guide tube 1GE and a jaw housing 115. The jaw housing 115 is secured to the clamp jaw 113 by a set screw 117. The set screw 117 is accessible through an opening 211 in the barrel B so that an operator may readily loosen it and remove the guide tube GE for any purpose. The clamp jaw 113 and jaw housing 115 may be composed of stainless steel, preferably #6478-1.

When the unit 1GE is held in the inner header DE as disclosed, the branch tube portions 203 and 205 project from the nozzle assembly N. A sleeve 231 encloses the nozzle assembly N and the branch tube portions 203 and 205. The sleeve 231 may be of an inside diameter slightly smaller than the outside diameter of the nozzle body and may be provided with longitudinal and transverse slits 233 and 235 which permit the sleeve to be slipped onto the nozzle body 13 and held thereon.

The gun also includes a plurality of tubes, WI, the water inlet, WO, the water outlet, and GI, the gas inlet, composed of copper, the ends of which extend through the handle HA. The ends of the tubes WI, WO and GI which extend through the handle HA are provided with fittings 123, 125 and 127, respectively.

The tubes WI, WO and GI pass through the openings 97, 99 and 101, respectively, in the header DE and are secured to the header by silver soldering. The gas tube GI passes through the opening 101 which communicates with the groove 71 in the insulating spacer SI. The water-inlet tube WI passes through the opening 97 which communicates with one longitudinal opening 61 in the spacer and the water-outlet tube WO communicates with the other longitudinal opening 63 in the spacer. The tubes WI and WO are thus in communication with the hollow space 15 within the nozzle body 13 and convey cooling fluid, preferably water, to the hollow space. The flow of the water is represented by heavy lined arrows in Figs. 3 and 4. The water outlet tube WO also conducts current through the header DE to the guide tube 1GE. The tube GI is in communication with the nozzle opening and conveys gas to the opening. The lighter arrows represent the flow of gas.

A flexible conduit assembly FE for transmitting the welding electrodes 1Z and 2Z is secured to the central opening 87 in the header DE. This assembly includes a tube 141 of copper or other suitable material in communication with the header DE on one side and with a flexible tube 151 leading into the gun on the other side. The welding electrodes 1Z and 2Z extend through the flexible tubes 141 and 151 into the guide tube 1GE and through it to the tip of the sleeve 231.

Figure 6:
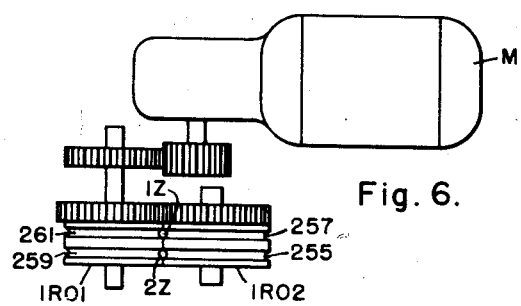
Fig. 6 is a fragmental view showing an electrode drive roll assembly used in the practice of this invention.

The electrodes 1Z and 2Z are transmitted through the cable 151 and through the gun by apparatus shown in Figs. 5 and 6. This apparatus includes a plurality of supply reels 251 and 253 which are mounted adjacent a drive assembly DR. The drive assembly includes a motor M which is geared to a pair of rollers 1RO1 and 1RO2. Each of the rollers is provided with a plurality of grooves 255, 257, 259 and 261. The rollers are disposed so that the grooves 255 and 259 and 257 and 261 are coextensive and the electrodes 1Z and 2Z are threaded into the drive DR so that each electrode 1Z and 2Z passes between coextensive grooves 255 and 259 and 257 and 261 of each of the rollers and is advanced by the grooves into the flexible cable 151 through which they are passed into the gun.

The electrode motor and the gun may be connected in circuit with a power supply unit in the manner generally shown in Fig. 7. Specific circuits of this type are disclosed in application Serial No. 550,105, filed by Fred J. Morley, Jr., Louis Manno and Austin Dixon, November 30, 1955, and application Serial No. 556,143, filed by Harry J. Bichsel and Alfred J. Baeslock, December 29, 1955. This system includes generally a power supply unit, a starting circuit, an inching circuit and a motor control circuit. The power supply unit has output terminals 271 and 273, the hot terminal 271 being connected to the electrodes through the guide assembly 1GE and the grounded terminal 273 to the work.

In welding with this apparatus, the electrodes 1Z and 2Z are threaded through the gun by the inching circuit in the manner disclosed in the above-identified applications. If difficulties are encountered in passing the electrodes through the branch tube portions 203 and 205 of the electrode guide tube unit 1GE, the unit may be removed from the gun by releasing the set screw 117 and the electrodes threaded through the unit 1GE by hand. Thereafter, the guide tube unit with the electrodes in it can be secured in the gun.

Once the electrodes 1Z and 2Z are threaded through the gun, arcs may be struck between the ends of the electrodes and the work by causing the electrodes to contact the work momentarily. Thereafter, the welding may proceed, a plurality of parallel beads or a plurality of parallel spots being produced during a welding operation.

Figure 8:
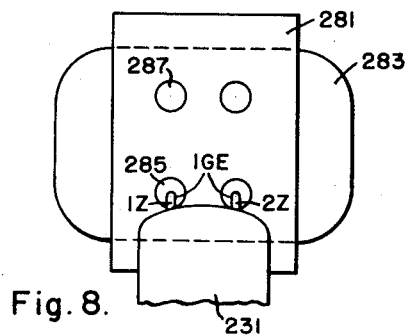
Fig. 8 is a view in elevation of a motor frame and footbracket showing the manner in which a gun in accordance with this invention is used in welding the footbracket to the frame.

The welding gun disclosed therein is particularly suitable for welding an assembly as shown in Fig. 8 of a footbracket 281 and the stator frame 283 of a motor. For joining purposes, the footbracket is provided with pairs of parallel openings 285 and 287 in which plug welds may be readily deposited from the separate electrodes 1Z and 2Z of a gun as disclosed above.

The invention is also applicable to welding in assembly as shown in Figs. 9 and 10, which includes a turbine-generator stator-blade ring 291 into which the vane blades 293 are welded. For insertion and welding of the blades, the ring 291 includes a plurality of elongated slots 295. Each blade is provided with an attenuated end 297 which is inserted in one of the slots 295 and joined to the ring by plug welds 299 and 301 at the ends of the slot. Such plug welds may be readily produced with a gun of the type disclosed herein.

In certain situations it is also desirable to produce a weld which is an alloy of different materials. In such situations electrodes 1Z and 2Z composed of the different materials may be transmitted through the gun in accordance with this invention and material from the electrodes may be deposited by producing arcs between a common pool and the electrodes.

While specific embodiments of this invention have been disclosed herein, many modifications thereof are feasible. The invention therefore is not to be restricted except insofar as is necessitated by the spirit of the prior art.

We claim as our invention:

1. A welding gun for gas shielded consumable electrode arc welding, said gun having a barrel having means for receiving electrodes, a channel through which said electrodes are transmitted and an opening at the end of said channel through which the tips of the electrodes forming a terminus of welding arcs extend, said gun including a single electrode guide-tube means terminating at the end of said channel adjacent said opening in a plurality of branch tube portions through which a plurality of separate electrodes may be passed in spaced relationship and means for conducting a gas along said guide tube means to said arcs.

2. A welding gun for gas shielded consumable electrode arc welding, said gun having a barrel having means for receiving electrodes, a channel through which said electrodes are transmitted and an opening at the end of said channel through which the tips of the electrodes forming a terminus of welding arcs extend, said gun including a single electrode guide-tube means terminating at the end adjacent said opening in said channel in a plurality of branch tube portions through which a plurality of separate electrodes may be passed in spaced relationship and means for conducting a gas along said guide tube means to said arcs, said conducting means including means enclosing said branch tube portions for guiding said shielding gas to said arcs.

References Cited in the file of this patent

UNITED STATES PATENTS

| Number | Name | Date |
|---|---|---|
| 786,911 | Miles et al. | Apr. 11, 1905 |
| 1,329,285 | Brownlee | Jan. 27, 1920 |
| 2,091,871 | Meier | Aug. 31, 1937 |
| 2,226,403 | Hopkins | Dec. 24, 1940 |
| 2,415,052 | Waddington | Jan. 28, 1947 |
| 2,658,162 | Tichenor et al. | Nov. 3, 1953 |
| 2,784,487 | Ronay | Mar. 12, 1957 |
| 2,806,125 | Miller | Sept. 10, 1957 |